US010627202B2

United States Patent
Narumi et al.

(10) Patent No.: US 10,627,202 B2
(45) Date of Patent: Apr. 21, 2020

(54) STEP GAUGE

(71) Applicant: MITUTOYO CORPORATION, Kawasaki-shi, Kanagawa (JP)

(72) Inventors: Tatsuya Narumi, Kawasaki (JP); Akihiko Matsuura, Miyazaki (JP); Kentaro Yano, Miyazaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 232 days.

(21) Appl. No.: 15/962,283

(22) Filed: Apr. 25, 2018

(65) Prior Publication Data

US 2018/0335290 A1  Nov. 22, 2018

(30) Foreign Application Priority Data

May 17, 2017  (JP) .................................. 2017-098288

(51) Int. Cl.
*G01B 3/30*  (2006.01)
*G01B 5/20*  (2006.01)
*G01B 21/04*  (2006.01)
*G01B 5/00*  (2006.01)

(52) U.S. Cl.
CPC .............. *G01B 3/30* (2013.01); *G01B 5/204* (2013.01); *G01B 21/042* (2013.01); *G01B 5/0002* (2013.01)

(58) Field of Classification Search
CPC ...... G01B 11/255; G01B 21/042; G01B 3/30; G01B 5/0002; G01B 5/204
USPC .......................................................... 33/567
See application file for complete search history.

(56) References Cited

U.S. PATENT DOCUMENTS

| | | | | |
|---|---|---|---|---|
| 3,908,278 | A | * | 9/1975 | Sundahl ................... G01B 3/30 33/502 |
| 4,373,267 | A | * | 2/1983 | Lycan ...................... G01B 3/30 33/502 |
| 5,231,768 | A | * | 8/1993 | Beckwith, Jr. ........... G01B 3/30 33/567 |
| 5,430,950 | A | * | 7/1995 | Beckwith, Jr. ........... G01B 3/30 33/567 |
| 10,352,678 | B2 | * | 7/2019 | Yokoyama ............. G01B 5/008 |
| 2003/0019119 | A1 | * | 1/2003 | Sato ....................... B23Q 17/24 33/503 |
| 2018/0335290 | A1 | * | 11/2018 | Narumi .................... G01B 3/30 |

FOREIGN PATENT DOCUMENTS

JP  2004-125665 A  4/2004

* cited by examiner

*Primary Examiner* — Yaritza Guadalupe-McCall
(74) *Attorney, Agent, or Firm* — Oliff PLC

(57) ABSTRACT

A step gauge includes: measurement blocks each having reference measurement surfaces; interval blocks each interposed between a pair of ones of the measurement blocks to keep a distance between the pair of ones of the measurement blocks at a predetermined distance, the measurement blocks and the interval blocks being alternately aligned one by one in one direction. The measurement blocks and the interval blocks each have a coefficient of linear thermal expansion of less than $0.03 \times 10^{-6}$ (1/K) and have through holes aligned in the one direction. The step gauge further includes a tie rod inserted in the through holes and countersunk screws respectively fixed to ends of the tie rod. The tie rod is made of a material having a coefficient of linear thermal expansion of less than $0.5 \times 10^{-6}$ (1/K).

1 Claim, 5 Drawing Sheets

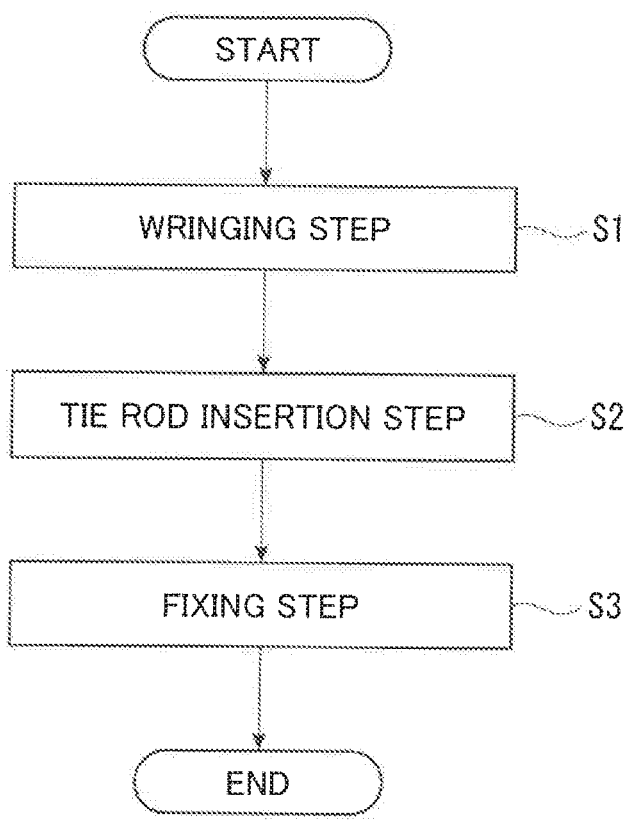

STEP GAUGE

The entire disclosure of Japanese Patent Application No. 2017-098288 filed May 17, 2017 is expressly incorporated by reference herein.

TECHNICAL FIELD

The present invention relates to a step gauge provided by coupling a plurality of end standards.

BACKGROUND ART

As a measurement instrument for measuring a surface profile, dimensions and the like of a measurement target, a measurement instrument configured to perform a calibration processing using a step gauge having reference measurement surfaces at every predetermined interval has been typically known (Patent Literature 1: JP2004-125665). In such a measurement instrument, calibration of dimensions can be conducted by measuring each of the reference measurement surfaces provided at every predetermined interval in the step gauge.

Such a step gauge typically includes: measurement blocks (end standard) each having reference measurement surfaces; and interval blocks each interposed between a pair of ones of the measurement blocks to keep a distance between the pair of ones of the measurement blocks strictly at a set distance, the measurement blocks and the interval blocks being alternately coupled one by one.

The above-described step gauge is required to exhibit an extremely small change in dimensions caused by a change in environments under which the step gauge is used and a change over time, because the step gauge is intended for calibration of the measurement instrument.

In recent years, there has been used a step gauge including the measurement blocks and the interval blocks made of an ultra-low expansion material in order to inhibit the change in the dimensions of the measurement blocks and the interval blocks caused by a temperature change.

However, even when the blocks are made of the ultra-low expansion material as described above, if a coupler coupling the blocks has a large coefficient of linear thermal expansion, a stress for coupling the blocks may be changed due the temperature change, which may change the dimensions of the entire step gauge.

SUMMARY OF THE INVENTION

An object of the invention is to provide a step gauge capable of being inhibited from being changed in dimensions due to a temperature change and the like.

According to an aspect of the invention, a step gauge includes: measurement blocks each having reference measurement surfaces; interval blocks each interposed between a pair of ones of the measurement blocks to keep a distance between the pair of ones of the measurement blocks at a predetermined distance, the measurement blocks and the interval blocks being alternately aligned one by one in one direction to define a series of the measurement blocks and the interval blocks, each of the measurement blocks and the interval blocks having a coefficient of linear thermal expansion of less than $0.03 \times 10^{-6}$(1/K) and having a through hole formed in the one direction; a shaft material inserted in the through hole of each of the measurement blocks and the interval blocks and disposed extending between terminal blocks of the series of the measurement blocks and the interval blocks aligned in the one direction, a longitudinal direction of the shaft material being aligned with the one direction; and stops respectively fixed to ends of the shaft material and being respectively in contact with the terminal blocks of the series of the measurement blocks and the interval blocks aligned in the one direction, wherein the shaft material is formed of a material having a coefficient of linear thermal expansion of less than $0.5 \times 10^{-6}$(1/K).

In the above aspect of the invention, the measurement blocks and the interval blocks of the step gauge are alternately aligned one by one in one direction to define the series of the measurement blocks and the interval blocks. The shaft material is inserted into the through holes formed along the one direction in the measurement blocks and the interval blocks. The stops are respectively fixed to the ends of the shaft material and are respectively in contact with the terminal ones of the blocks (i.e., the measurement blocks and the interval blocks) aligned in the one direction. Specifically, the blocks aligned in the one direction are clamped by the stops fixed to the respective ends of the shaft material and are applied with stress in a direction approaching each other. In other words, the blocks are fixed to each other by an axial force of the shaft material.

In the above aspect of the invention, each of the measurement blocks and the interval blocks is formed of a low expansion material having a coefficient of linear thermal expansion of less than $0.03 \times 10^{-6}$(1/K) and the shaft material is formed of a low expansion material having a coefficient of linear thermal expansion of less than $0.5 \times 10^{-6}$(1/K)

The shaft material in conjunction with the stops fixed to the respective ends of the shaft material applies the stress to the blocks in a direction clamping the blocks. Since the shaft material receives the axial force in this arrangement, when the shaft material is made of, for instance, ceramics, the shaft material may be broken depending on a magnitude of the axial force. On the other hand, when the shaft material is made of metals such as iron and copper, the shaft material is inhibited from being broken, but is thermally expanded due to change in an ambient temperature, which reduces the axial force for fixing the blocks. In this case, a length of the entire step gauge is changed. In contrast, in the above aspect of the invention, by using the above-described shaft material, the shaft material is not broken and the axial farce of the shaft material is inhibited from decreasing due to the change in the ambient temperature, so that the step gauge can be inhibited from being changed in the dimensions due the change in the ambient temperature.

Thus, a step gauge capable of being inhibited from being changed in dimensions due to the temperature change and capable of carrying out a highly precise calibration processing in a measurement instrument can be provided.

BRIEF DESCRIPTION OF DRAWING(S)

FIG. 5 is a flowchart showing a manufacturing method of the step gauge of the exemplary embodiment.

DESCRIPTION OF EMBODIMENT(S)

A step gauge in an exemplary embodiment of the invention will be described below.

Figure 1:
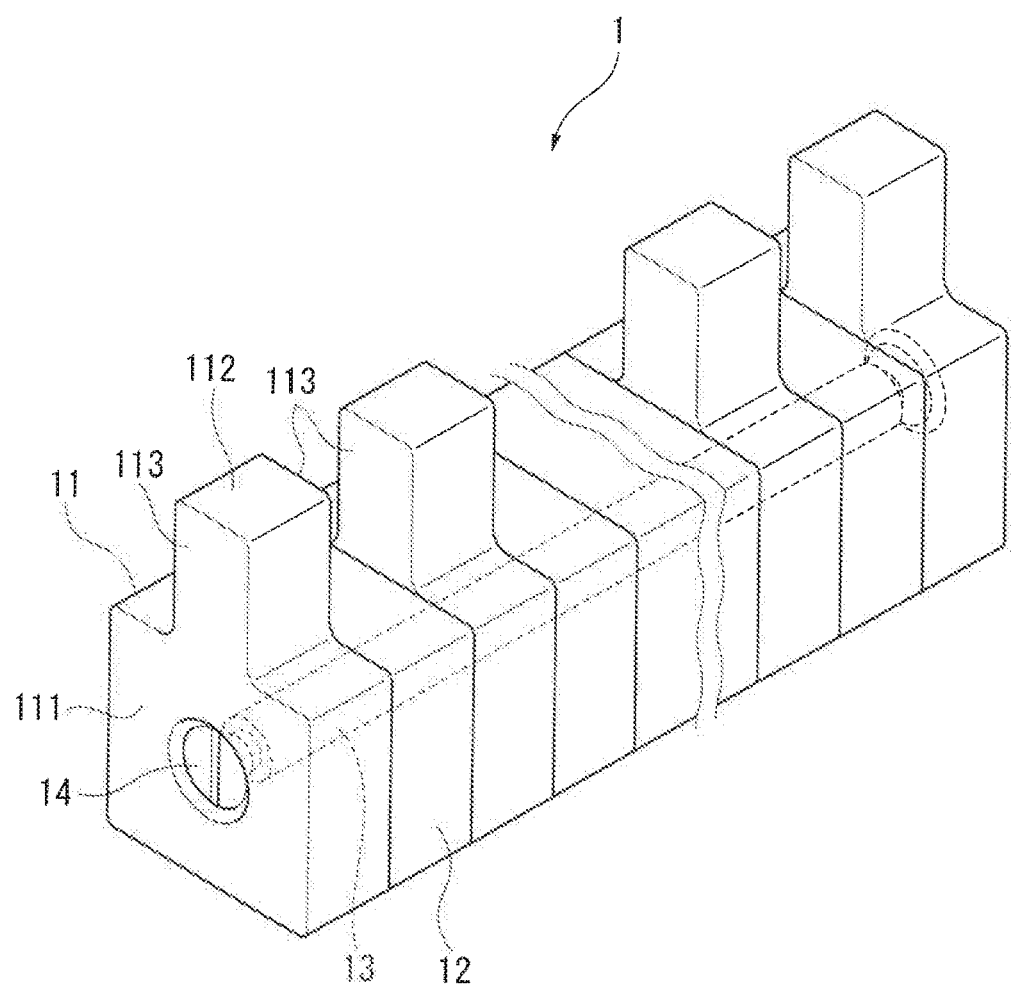
FIG. 1 is a perspective view schematically showing a step gauge in an exemplary embodiment of the invention.
Figure 1:
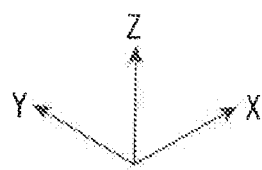
Figure 2:
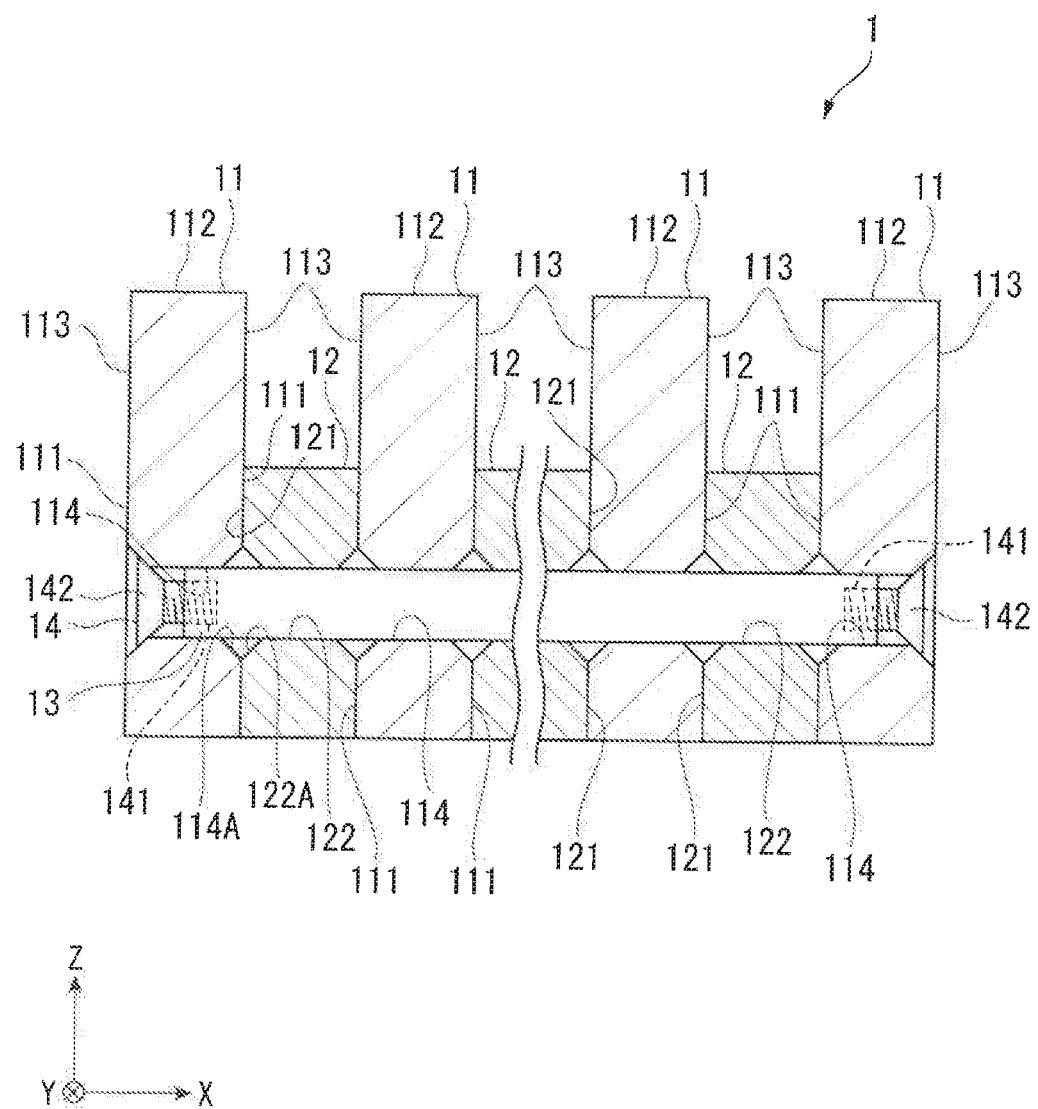
FIG. 2 is a cross-sectional view in a longitudinal direction of the step gauge in the exemplary embodiment.

FIG. 1 is a perspective view schematically showing the step gauge in the exemplary embodiment. FIG. 2 is a cross-sectional view in a longitudinal direction of the step gauge in the exemplary embodiment.

A step gauge 1 is a reference gauge whose longitudinal direction is aligned with one direction (X direction). As shown in FIGS. 1 and 2, the step gauge 1 includes: a plurality of measurement blocks 11; a plurality of interval blocks 12; a tie rod 13 (shaft material) coupling the measurement blocks 11 and the interval blocks 12; and countersunk screws 14 (stops) provided to respective ends of the tie rod 13.

Each of the measurement blocks 11 includes: first lateral surfaces 111 each extending along a plane intersecting with an X direction (orthogonal to the X direction in the exemplary embodiment); and a gauge portion 112 projecting in a Z direction intersecting with the X direction (orthogonal to the X direction in the exemplary embodiment).

The first lateral surface(s) 111, which is a smooth and flat surface along a YZ plane orthogonal to the X direction, is tightly fixed (wrung) to second lateral surface(s) 121 of each of the interval blocks 12 described later. A distance between a pair of first lateral surfaces 111 of a single measurement block 11 is preset at a predetermined dimension.

The gauge portion 112 has reference measurement surfaces 113 to be measured at a calibration processing for a measurement instrument. The reference measurement surfaces 113, each of which is a smooth and flat surface in parallel to the YZ plane orthogonal to the X direction, are provided in pair to the gauge portion 112. Since the measurement blocks 11 are strictly equidistant from each other using the interval blocks 12 in the exemplary embodiment, the facing reference measurement surfaces 113 of the respective gauge portions 112 of adjacent ones of the measurement blocks 11 are also equidistant from each other.

Each of the measurement blocks 11 has a through hole 114 formed along the X direction. The tie rod 13 is inserted into the through hole 114.

The through hole 114 has enlarged portions 114A at both ends, the enlarged portions 114A being enlarged from an inside of each of the measurement blocks 11 toward the respective first lateral surfaces 111 and each having a substantially conic inner surface. The enlarged portions 114A are optionally filled with an adhesive for adhesively fixing the tie rod 13 to the measurement blocks 11.

Each of the interval blocks 12 is interposed between the measurement blocks 11 aligned in the X direction. In other words, the step gauge 1 is structured such that the measurement blocks 11 and the interval blocks 12 are alternated one by one to be aligned in the X direction. Although both terminal blocks of the step gauge 1 in the X direction are the measurement blocks 11 as an example in the exemplary embodiment, one or both of the terminal blocks may be the interval blocks 12.

Each of the interval blocks 12 has the second lateral surfaces 121 formed along a plane intersecting with the X direction (orthogonal to the X direction in the exemplary embodiment).

The second lateral surfaces 121 of each of the interval blocks 12 are respectively wrung to adjacent ones of the first lateral surfaces 111 of the measurement blocks 11 in the X direction. A distance between a pair of second lateral surfaces 121 of a single interval block 12 is preset at a predetermined dimension. With this arrangement, the interval blocks 12 define the measurement blocks 11 to be disposed from adjacent ones at a predetermined distance.

Each of the interval blocks 12 has a through hole 122 formed along the X direction. The through hole 122 is coaxial with the through hole 114 of each of the measurement blocks 11. The tie rod 13 is inserted into the through hole 122.

Moreover, the through hole 122 has enlarged portions 122A that are enlarged from an inside thereof toward the respective second lateral surfaces 121, at both ends of the through hole 122 in the same manner as the through hole 114 of each of the measurement blocks 11. The enlarged portions 122A are shaped the same as the enlarged portions 114A of each of the measurement blocks 11 and are optionally filled with an adhesive for adhesively fixing the tie rod 13 to the interval blocks 12.

The above-described measurement blocks 11 and interval blocks 12 are each made of an ultra-low expansion material having a coefficient of linear thermal expansion of less than $0.03 \times 10^{-6} (1/K)$.

It should be noted that a block gauge and a step gauge commonly used are made of steel (coefficient of linear thermal expansion: $10.8 \times 10^{-6} (1/K)$) and zirconia ceramic (coefficient of linear thermal expansion: $9.3 \times 10^{-6} (1/K)$). If such materials are used for the measurement blocks 11 and the interval blocks 12, the measurement blocks 11 and the interval blocks 12 per se are heat-shrunk or thermally expanded due to a temperature change. Accordingly, even if the calibration processing in the measurement instrument is carried out using the step gauge made of the above material, the calibration processing becomes significantly imprecise, so that a highly precise (highly reliable) calibration processing cannot be carried out.

In contrast, in the exemplary embodiment of the invention, the measurement blocks 11 and the interval blocks 12 are made of the ultra-low expansion material having a coefficient of linear thermal expansion of less than $0.03 \times 10^{-6} (1/K)$. For instance, the ultra-low expansion material is made of NEXCERA (registered trademark) having a coefficient of linear thermal expansion at 20 degrees C. of approximately 0.0.

Accordingly, the dimensions of the measurement blocks 11 and the interval blocks 12 are almost unchanged even when an ambient temperature is changed, so that a highly reliable calibration processing can be performed in the measurement instrument.

Referring back to FIGS. 1 and 2, the tie rod 13 is inserted into the through holes 114 of the measurement blocks 11 and the through holes 122 of the interval blocks 12. The tie rod 13 has screw holes on respective end surfaces of both longitudinal ends. The countersunk screws 14 are screwed into the respective screw holes.

A length of the tie rod 13 is shorter than a length of the step gauge 1 in the X direction. Accordingly, the ends of the tie rod 13 are positioned inside the terminal blocks (the measurement blocks 11 in the exemplary embodiment) disposed at the ends of the step gauge 1 in the X direction. Among the first lateral surfaces 111 of each of the measurement blocks 11 disposed at the ends of the step gauge 1, a distance between the first lateral surface 111 in no contact with the interval block 12 and the end of the tie rod 13 is preset at a predetermined distance. The distance is enough for a screw portion 141 of the countersunk screw 14 to be screwable into the screw hole of the tie rod 13.

Moreover, the tie rod 13 is optionally adhesively fixed to each of the blocks (the measurement blocks 11 and the interval blocks 12) using an adhesive.

Each of the countersunk screws 14 is made of, for instance, SUS410 steel and includes: the screw portion 141 screwed into the screw hole of the tie rod 13; and a head 142 formed at an end of the screw portion 141. The head 142 has a substantially conic bevel capable of contacting with the corresponding one of the enlarged portions 114A and 122A of the blocks 11 and 12. The bevel is brought into contact with the inner surface of the corresponding one of the enlarged portions 114A.

By fastening the countersunk screws 14 at both ends of the tie rod 13, the blocks 11 and 12 of the step gauge 1 are clamped between the countersunk screws 14 in pairs. In other words, the tie rod 13 is pulled toward both the ends thereof by a fastening torque of the countersunk screws 14 to be applied with an axial force. This axial force causes the blocks 11 and 12 to be pressed with each other in the X direction, so that the first lateral surfaces 111 and the second lateral surfaces 121 are fixed to each other in a wringing state.

In the exemplary embodiment, the tie rod 13 is formed of a low expansion material having a coefficient of linear thermal expansion of less than $0.5 \times 10^{-6}$ (1/K).

If the tie rod 13 is made of a material having a larger coefficient of linear thermal expansion, the tie rod 13 is thermally expanded when the ambient temperature is changed, so that the fastening torque of the countersunk screws 14 is changed (i.e., decreased). When the fastening torque is thus changed, the axial force of the tie rod 13 is decreased. Moreover, once the ambient temperature of the step gauge 1 is changed from a reference temperature (e.g., a room temperature) to a high temperature, even if the ambient temperature is returned to the reference temperature, the fastening torque of the countersunk screws 14 is not recovered. Consequently, since the force of clamping the blocks 11 and 12 (i.e., a force of maintaining the wringing state) is decreased, the entire dimensions of the step gauge 1 are changed even when the dimensions of the blocks 11 and 12 are unchanged.

The tie rod 13 requires a strength against the axial force in order to prevent the tie rod 13 from being broken due to the axial force. For this reason, the tie rod 13 is preferably made of a metal material. However, if the tie rod 13 is made of a typical metal material, since the metal material has a large coefficient of linear thermal expansion as described above, the dimensions of the step gauge 1 are changed due to the temperature change.

Figure 3:
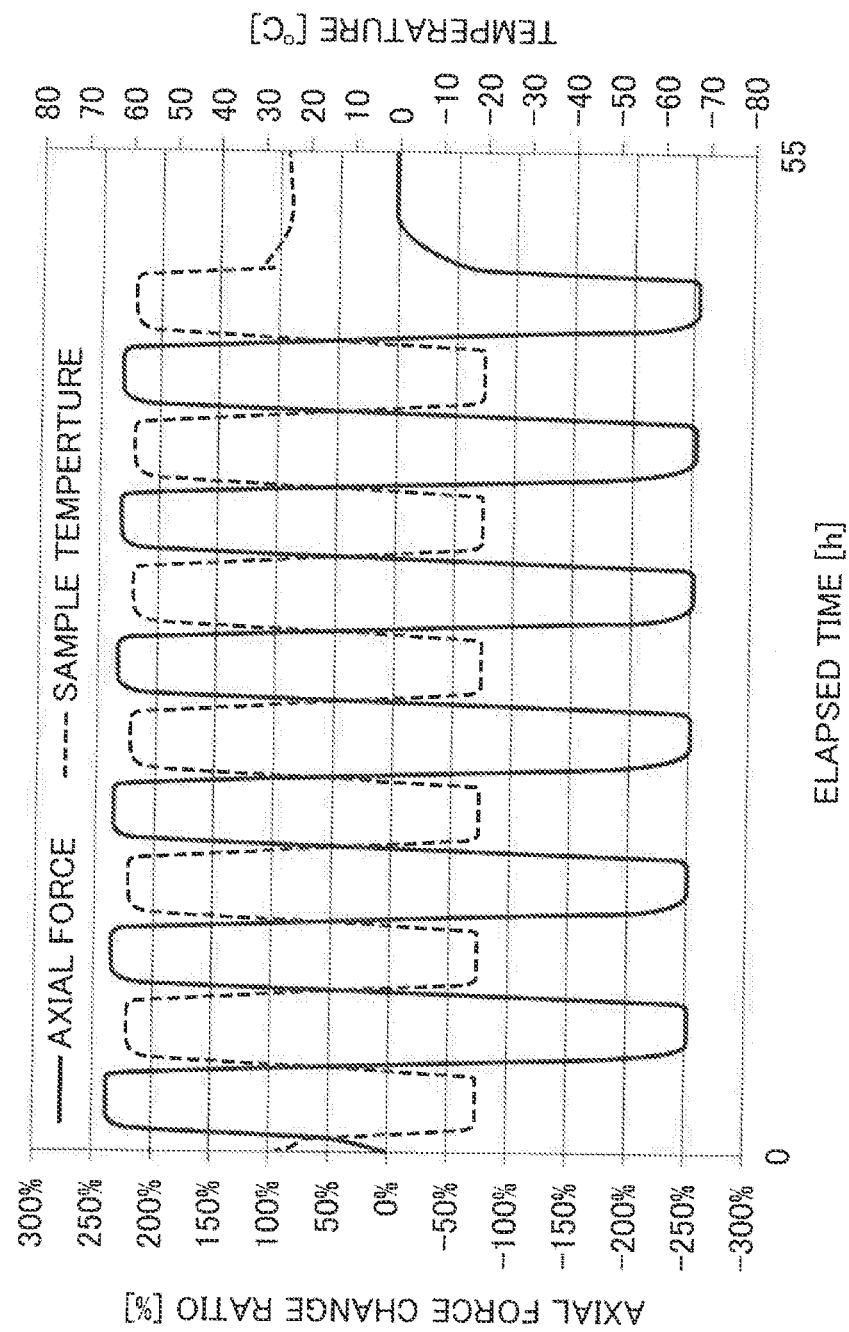
FIG. 3 is a graph showing whether an axial force is changed or unchanged when an ambient temperature of the step gauge is changed from reference temperature to 60 degrees C. and to minus 20 degrees C.

FIG. 3 shows whether the axial force is changed or unchanged when the ambient temperature of the step gauge 1 is changed from the reference temperature (20 degrees C.) to 60 degrees C. and to minus 20 degrees C.

As shown in FIG. 3, it is found that the axial force is changed following the temperature change. When the ambient temperature of the step gauge 1 is increased, the axial force is decreased. Reversely, when the ambient temperature of the step gauge 1 is decreased, the axial force is increased. When the tie rod 13 is made of Super Invar including a typical low expansion metal (coefficient of linear thermal expansion: from $1.3 \times 10^{-6}$ (1/K) to $2.0 \times 10^{-6}$ (1/K)), the axial force of the step gauge 1 is decreased up to about 35% at the maximum.

In contrast, in the exemplary embodiment, the material having a coefficient of linear thermal expansion of less than $0.5 \times 10^{-6}$ (1/K), for instance, a coefficient of linear thermal expansion of $0 \pm 0.2 \times 10^{-6}$ (1/K), is used as the tie rod 13.

Figure 4:
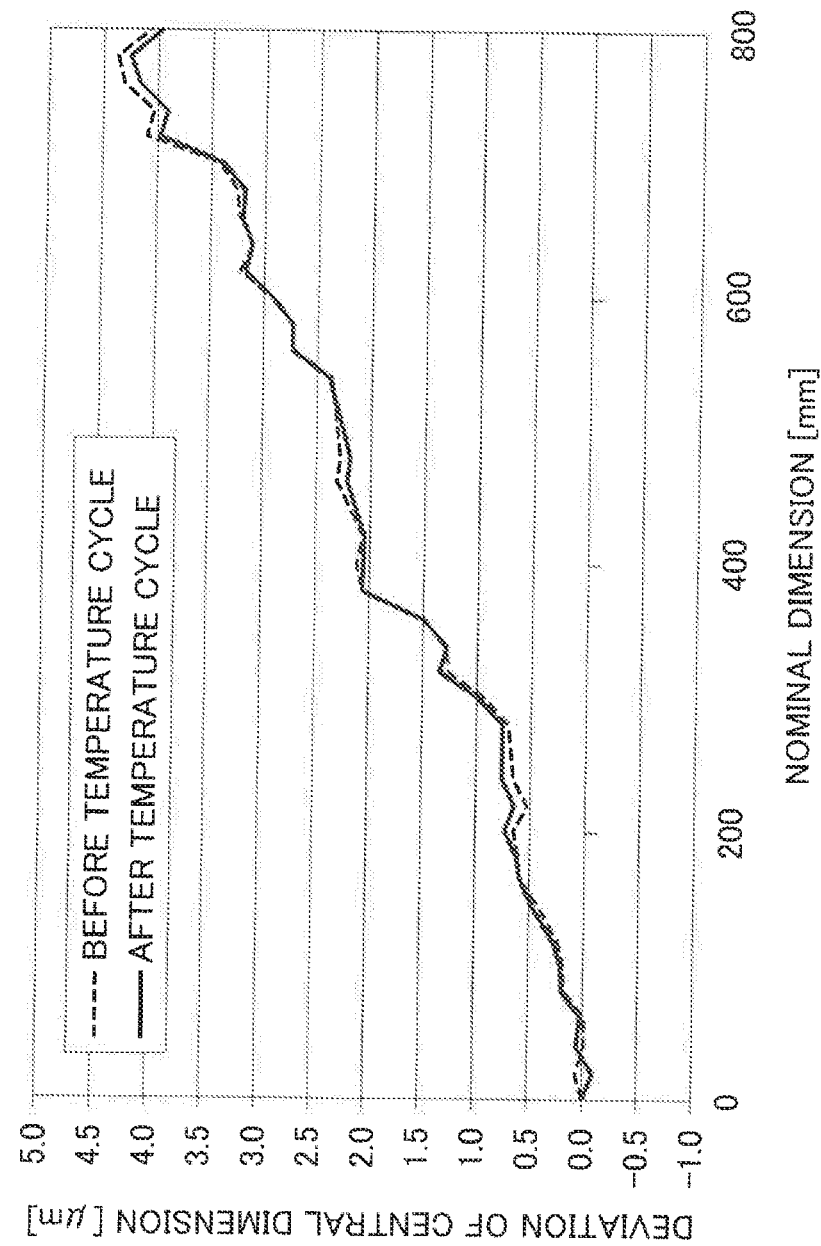
FIG. 4 illustrates a comparison between central dimensions after a test shown in FIG. 3.

FIG. 3 is a graph showing whether the axial force is changed or unchanged when the ambient temperature of the step gauge 1 including the tie rod 13 made of the above material is changed from the reference temperature to 60 degrees C. and to minus 20 degrees C. and subsequently the ambient temperature is returned to the reference temperature. FIG. 4 shows a comparison between central dimensions after the test was conducted.

It can be understood from FIG. 3 that the axial force was almost unchanged when the material having the coefficient of linear thermal expansion of less than $0.5 \times 10^{-6}$ (1/K) was used as the tie rod 13. Moreover, since the change in the axial force is inhibited, the change in the dimensions after the ambient temperature is returned to the reference temperature can also be inhibited.

Manufacturing Method of Step Gauge

Next, a manufacturing method of the above-described step gauge 1 will be described.

FIG. 5 is a flowchart showing a manufacturing method of the step gauge 1.

The step gauge 1 is manufactured by carrying out a wringing step S1, a tie rod insertion step S2, and a fixing step S3.

First, in the wringing step S1, the measurement blocks 11 are alternated one by one with the interval blocks 12 and the first lateral surfaces 111 of the measurement blocks 11 are brought into a tight contact with the second lateral surfaces 121 of the interval blocks 12 for wringing.

Subsequently, the tie rod insertion step S2 is carried out. In the tie rod insertion step S2, an adhesive is optionally fed into inner diameter portions of the through holes 114 and 122 of the measurement blocks 11 and the interval blocks 12 wrung together. With this operation, the adhesive enters the enlarged portions 114A provided at both sides of each of the through holes 114 and the enlarged portions 122A provided at both sides of each of the through holes 122. Subsequently, the tie rod 13 is inserted into the through holes 114 and 122. By the insertion of the tie rod 13, the fed adhesive is discharged from a side of the through holes 114 and 122 opposite from a side thereof into which the tie rod 13 is inserted, but the adhesive remains in the enlarged portions 114A and 122A.

Then, the countersunk screws 14 are screwed into the screw holes of both the ends of the tie rod 13 to be fastened to the tie rod 13. At this time, the countersunk screws 14 are screwed into the tie rod 13 by a fastening torque such that the axial force of the tie rod 13 reaches a predetermined axial force (e.g., 420 N). With this operation, the blocks 11 and 12 are fixed together by the axial force to form the step gauge 1.

Advantage(s) of Exemplary Embodiment(s)

In the step gauge 1 in the above exemplary embodiment, the measurement blocks 11 having the reference measurement surfaces 113 are alternated one by one with the interval blocks 12 in the X direction, and the measurement blocks 11 and the interval blocks 12 are wrung together. Since the tie rod 13 is inserted in the through holes 114 of the measurement blocks 11 and the through holes 122 of the interval blocks 12 and the countersunk screws 14 are fastened to the respective ends of the tie rod 13 by a predetermined fastening torque, the measurement blocks 11 and the interval blocks 12 are fixed together by the axial force of the tie rod.

In the step gauge 1, the measurement blocks 11 and the interval blocks 12 each are made of the material having the coefficient of linear thermal expansion of less than $0.03 \times 10^{-6}(1/K)$ and the tie rod 13 is made of the material having the coefficient of linear thermal expansion of less than $0.5 \times 10^{-6}(1/K)$.

In this arrangement, even if the temperature of the step gauge 1 becomes high due to the change in the ambient temperature, the dimensions of the blocks 11 and 12 are inhibited from being changed since the blocks 11 and 12 each have a small coefficient of linear thermal expansion. Moreover, since the tie rod 13 also has a small coefficient of linear thermal expansion, even if the temperature of the step gauge 1 becomes high, the change in the fastening torque of the countersunk screws 14 can be inhibited and the change in the axial force can also be inhibited.

Consequently, the change in the dimensions of the step gauge 1 caused by the temperature change can be inhibited and a highly reliable calibration processing can be conducted with a reduced imprecision when the calibration processing is carried out in the measurement instrument.

Modification(s)

It should be understood that the scope of the invention is not limited to the above-described exemplary embodiment(s) but includes modifications and improvements as long as the modifications and improvements are compatible with the invention.

For instance, in the above exemplary embodiment, the first lateral surfaces 111 and the second lateral surfaces 121 are smooth and flat surfaces along the YZ plane orthogonal to the X direction. Alternatively, for instance, the first lateral surfaces 111 may be inclined relative to the X direction. In this case, it is only required that the second lateral surfaces 121 are also inclined relative to the X direction at the same inclination angle as that of the first lateral surfaces 111. Even in this case, the wringing of the first lateral surfaces 111 and the second lateral surfaces 121 can be made.

However, since a component force of the axial force may work in a planar direction (i.e., an inclination direction relative to the X direction) of the first lateral surfaces 111 and the second lateral surfaces 121, the measurement blocks 11 may be displaced in the inclination direction. In this case, for instance, by strictly fitting an outer diameter of the tie rod 13 to an inner diameter of the through holes 114 and 122, the positional misalignment between the blocks 11 and 12 can be avoided.

Although the stops are exemplified by the countersunk screws 14 in the above exemplary embodiment, the stops are not limited thereto. In other words, the stops are only required to clamp the blocks 11 and 12 at the terminal ones thereof and be fastened to the tie rod 13 to apply the axial force to the tie rod 13. For instance, male screw shafts may be formed on the tie rod 13 in a manner to project in the X direction from the tie rod 13 and nuts may be engaged to the respective male screw shafts. Also in this case, the tie rod 13 is applied with the axial force by a fastening torque of the nuts, so that the blocks 11 and 12 can be firmly fixed together.

Further, the specific arrangements may be altered in any manner as long as the modifications and improvements are compatible with the invention.

What is claimed is:

1. A step gauge comprising;
   measurement blocks each having reference measurement surfaces;
   interval blocks each interposed between a pair of ones of the measurement blocks to keep a distance between the pair of ones of the measurement blocks at a predetermined distance, the measurement blocks and the interval blocks being alternately aligned one by one in one direction to define a series of the measurement blocks and the interval blocks, each of the measurement blocks and the interval blocks having a coefficient of linear thermal expansion of less than $0.03 \times 10^{-6}(1/K)$ and having a through hole formed in the one direction;
   a shaft material inserted in the through hole of each of the measurement blocks and the interval blocks and disposed extending between terminal blocks of the series of the measurement blocks and the interval blocks aligned in the one direction, a longitudinal direction of the shaft material being aligned with the one direction; and
   stops respectively fixed to ends of the shaft material and being respectively in contact with the terminal blocks of the series of the measurement blocks and the interval blocks aligned in the one direction, wherein
   the shaft material is formed of a material having a coefficient of linear thermal expansion of less than $0.5 \times 10^{-6}(1/K)$.

* * * * *